(12) United States Patent
Ye

(10) Patent No.: US 9,530,067 B2
(45) Date of Patent: Dec. 27, 2016

(54) METHOD AND APPARATUS FOR STORING AND RETRIEVING PERSONAL CONTACT INFORMATION

(71) Applicant: ULSee Inc., Taipei (TW)

(72) Inventor: Zhou Ye, Foster City, CA (US)

(73) Assignee: ULSee Inc., Taipei (TW)

( * ) Notice: Subject to any disclaimer, the term of this patent is extended or adjusted under 35 U.S.C. 154(b) by 27 days.

(21) Appl. No.: 14/084,630

(22) Filed: Nov. 20, 2013

(65) Prior Publication Data

US 2015/0139508 A1 May 21, 2015

(51) Int. Cl.
*G06K 9/00* (2006.01)
*G10L 15/26* (2006.01)

(52) U.S. Cl.
CPC ....... *G06K 9/00892* (2013.01); *G06K 9/00221* (2013.01); *G10L 15/26* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 7,058,208 B2 | 6/2006 | Chang et al. | |
| 7,986,843 B2 | 7/2011 | Chaudhury et al. | |
| 8,244,037 B2 | 8/2012 | Huang | |
| 2003/0035567 A1* | 2/2003 | Chang | G07C 9/00158 382/115 |
| 2010/0302001 A1* | 12/2010 | Cole | G07C 9/00158 340/5.83 |
| 2011/0025842 A1* | 2/2011 | King | G06F 17/211 348/135 |
| 2011/0085211 A1* | 4/2011 | King | G06F 17/30011 358/474 |
| 2011/0087749 A1* | 4/2011 | Swink | H04L 51/32 709/206 |
| 2011/0145068 A1* | 6/2011 | King | G06F 17/211 705/14.55 |

(Continued)

FOREIGN PATENT DOCUMENTS

| | | |
|---|---|---|
| WO | 2011/050714 A1 | 5/2011 |
| WO | 2013/078075 A1 | 5/2013 |

*Primary Examiner* — Chan Park
*Assistant Examiner* — Iman K Kholdebarin
(74) *Attorney, Agent, or Firm* — Alan D. Kamrath; Kamrath IP Lawfirm, P.A.

(57) ABSTRACT

Method for a wearable device worn by a first user to generate or retrieve a personal contact record when encountering a second user is disclosed. The method of generating the personal contact record includes capturing a facial photograph of the second user and generating a face information; capturing a card photograph of a business card and performing OCR to obtain a card information; retrieving time and location information to obtain an encounter information; and generating the personal contact information. The method of retrieving the personal contact record includes capturing a facial photograph of the second user; searching through a contact database comprising facial images associated with identities of persons, and attempting to match the captured facial photograph with one of the facial images in the contact database to determine the identity of the second user, and providing messages. Wearable devices for performing the above methods are also disclosed.

20 Claims, 7 Drawing Sheets

(56) References Cited

U.S. PATENT DOCUMENTS

| | | | | |
|---|---|---|---|---|
| 2012/0008875 A1* | 1/2012 | Martensson | ............ | G10L 17/26 |
| | | | | 382/305 |
| 2015/0063714 A1* | 3/2015 | King | ........................ | G06K 9/72 |
| | | | | 382/229 |
| 2015/0161474 A1* | 6/2015 | Jaber | ........................ | G06K 9/52 |
| | | | | 382/203 |

* cited by examiner

US 9,530,067 B2

METHOD AND APPARATUS FOR STORING AND RETRIEVING PERSONAL CONTACT INFORMATION

FIELD OF THE INVENTION

The present invention is directed to a method and apparatus for generating and retrieving personal contact information; and in particular, the present invention is directed to a method to generate and/or retrieve a personal contact record including face, card, encounter, and status information on a wearable device by storing or matching with the face or voice information in a contact database, and generating messages including such stored information, and a wearable device worn by a person capable of performing the method thereof.

BACKGROUND OF THE INVENTION

In business, it is often said that the building of extraordinary connections and relationships often contributes to great success. It is well known that effective communications with other people is one of the keys for building successful interpersonal relationships between individuals. Meanwhile, effective communications with others often require one person to have adequate or sufficient information of another person based on their shared previous encounters as well as having accurate up-to-date individualized personal information of the other person. In addition, it is known that sharing of common interests between individuals help to build good relationship. For example, if someone meets another person, and realizes that the person has just recently gave birth to a baby boy, then having their subsequent conversation during that particular encounter session to include such information can provide for a more engaging, stimulating and richer conversation experience therebetween.

Traditionally people have relied on drawing upon their own personal memory for recalling personal information of others, writing and keeping notes kept in personal notebooks, or by looking up contact notes kept in mobile electronic devices such as smartphone, tablet PCs, and laptops, so as to be able to retrieve gathered information from previous encounters with others. Apart from the instantly-retrieved information obtained by recalling from personal memory, all of the other conventional types of personal contact information retrieval techniques have to be performed in a delayed manner (with lag in time), and not achievable in real-time when needed the most upon the encounter. Therefore, a person cannot effectively rely on these conventional personal contact information retrieval methods to search for respective information for acquaintances, business contacts, and friends to fulfill real-time personal contact information retrieval needs. Therefore, there is room for improvement in the art.

SUMMARY OF THE INVENTION

An object of the present invention is to provide a method to generate a personal contact record of a user. The personal contact record includes respective face information, card information, previous encounter information, and status information thereof on a wearable device.

An object of the present invention is to provide a method to retrieve a personal contact record of a user by matching a facial photograph and/or a voice recording sample of the user with the facial photographs and/or the voice recording files previously stored in a contact database, determining the identity of the user, and providing an oral or visual message including the full name, previous encounter information, and status information of the user.

An object of the present invention is to provide a wearable device worn by a person capable of generating and/or retrieving the personal contact record(s) of one or more users.

These and other objects are attained by a method for a wearable device worn by a first user to generate a personal contact record of a second user. The method includes the following steps: capturing a facial photograph and generating a face information of the second user; capturing a card photograph of a business card of the second user; performing optical character recognition (OCR) to the business card and generating a card information of the second user; retrieving time and location information and obtaining an encounter information. Optional steps for the above method may include the following: receiving a voice recording sample of the second user and generating a voice information thereof; accessing a social network and obtaining a status information of the second user. In the above method, the face information, the card information, the encounter information, and the voice information are included in the personal contact record. The personal contact record may be stored on the wearable device or on a cloud storage service. In addition, the encounter information may optionally include discussion information collected from communications taken place between the first user and the second user during the encounter session. The encounter session of the first user and the second user may be taken place in the form of an in-person encounter or a virtual encounter. In the case of the virtual encounter, the facial photograph is obtained by capturing a picture of the second user showing on a display, and the card photograph is obtained by capturing a picture of the business card also showing on the display.

These and other objects are attained by a method for a wearable device worn by a first user to retrieve a personal contact record of a second user. The method includes the following steps: capturing a facial photograph of the second user; searching through a contact database comprising facial images of persons, in which each of the facial images in the contact database is associated with a corresponding identity of the person of which the facial image belongs to thereof, respectively, and attempting to match the captured facial photograph of the second user with one of the facial images in the contact database, and upon matching of the captured facial photograph, determining the corresponding identify of the person of the matched facial image. The above method may further include receiving a voice recording sample of the second user, and searching through the contact database comprising voice recording files, in which each voice recording file in the contact database is associated with a corresponding identity of the person of which the voice recording file belongs to thereof, respectively, and attempting to match the received voice recording sample of the second user with one of the voice recording files in the contact database, and upon matching of the voice recording sample, determining the corresponding identity of the person of the matched voice recording file; generating a first message including at least a full name; generating a second message including an encounter information including time and location of an encounter session. A third message, which is optional, including a status information, is obtained by accessing a social network on behalf of the first user, performing a search for the full name or the e-mail address of the second user on the social network, and retrieving messages which were posted by the second user having received the highest number of recent feedbacks within a certain period of time. The first message, the second message, and the optional third message are provided to the first user in an oral or visual manner when the first user encounters the second user.

An encounter location information, belonging to the encounter information (since an encounter information includes the time and location of an encounter session), may be obtained by using a GPS, Cellular, or Wifi signals to determine the location of the wearable device at the encounter session. The encounter location information may also be obtained by searching and identifying or recognizing places and landmarks containing in the background of the facial photograph taken in the encounter session. In one embodiment, the encounter location information is provided to the first user in a format such as an address, a building name, or an event venue title, which may be obtained by referring to a map or the first user's calendar around the time of the encounter session. The performing of facial recognition on the facial photograph may be included in the step for searching through a contact database containing facial images of persons for attempting to match and identify the captured facial photograph with one of the facial images of persons in the contact database in the above method for the first user to retrieve the personal contact record of the second user from the wearable device. The facial recognition may include identifying of facial features by extracting landmarks, features, visual details of the skin, as captured in a camera of the wearable device. The facial recognition may also include using a 3D (three-dimensional) image capturing device to capture information about the shape of a face, and the information is then used to identify distinctive features on the surface of a face, such as the contour of the eye sockets, nose, and chin.

In the above methods for retrieving personal contact information, the performing of speaker recognition is included in the step for matching of the received voice recording sample of a second user with one of the voice recording files in the contact database for determining the corresponding identity of the person of the matched voice recording file. The speaker recognition may use the acoustic features of speech that are found to be different between individuals. The acoustic features of speech may include anatomy and learned behavioral patterns.

These and other objects are attained by a wearable device worn by a first user so as to be capable of performing the method to generate or retrieve a personal contact record of a person including the face, card, encounter, and status information. According to a first embodiment, the wearable device includes a camera, (optionally) a microphone, an optical character recognition (OCR) module, a location identifying module, a datetime module, and a record generating module for generating a personal contact record including the face information, the card information, the location information, the time information, and (optionally) the voice information, and for storing the personal contact record into the contact database. In an alternative embodiment, the wearable device may perform automatic speech recognition (ASR) to the surrounding or ambient voices for a certain period of time for isolating and analyzing various voices, extracting a plurality of keywords from the voice recording samples, and then including the keywords to the personal contact record of the contact database. The camera is configured to capture a card photograph of a business card and a facial photograph of the second user. The camera can be triggered to take the photographs by the first user (by either entering a voice command or clicking a physical/virtual button on the wearable device) upon encountering the second user in an encounter session. The OCR module is used for performing optical character recognition (OCR) on the card photograph and generating a card information. The location identifying module is used for providing a location information identifying the location of the wearable device during the encounter session. The datetime module is used for providing a time information of the encounter session. In addition, optionally, the wearable device may further include a microphone for receiving a voice recording sample of the second user and generating a voice information. The microphone may also receive a voice command from the first user, so as to activate the wearable device to generate the personal contact record. The first user may provide a voice memo for the encounter session, and the voice memo may be converted into a text memo by a voice recognition module to be incorporated into the personal contact record, and stored in the contact database for later retrieval upon the next encounter session.

These and other objects are attained by a wearable device to be worn by a first user. The wearable device includes a processor, a communication module for providing internet access, and a camera for capturing a facial photograph of a second user according to a second embodiment. In the wearable device of the second embodiment, the processor is configured to search through a contact database containing facial images of persons for identifying a facial photograph of a second user which corresponds to one of the facial images in the contact database, generate a first message including a card information including at least a full name, generate a second message including an encounter information including time and location, and (optionally) the text memo, and (optionally) generate a third message including a status information obtained by performing a search on a social network for latest status update of the second user. The communication module may include a cellular communication unit (not shown) for connecting to the nearby base stations, or include a local communication module for connecting to a Wifi access point. The Wifi access point may be a Wifi hotspot or a smartphone equipped with Wifi functionality. The wearable device may further include a loudspeaker and/or a display for reproducing the first message, the second message, and the optional third message to the first user in an oral or visual manner. The wearable device may include a facial recognition module for performing facial recognition on the facial photograph. The wearable device may further include a microphone for receiving a voice recording sample of the second user, and a speaker recognition module for performing speaker recognition on the voice recording sample.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
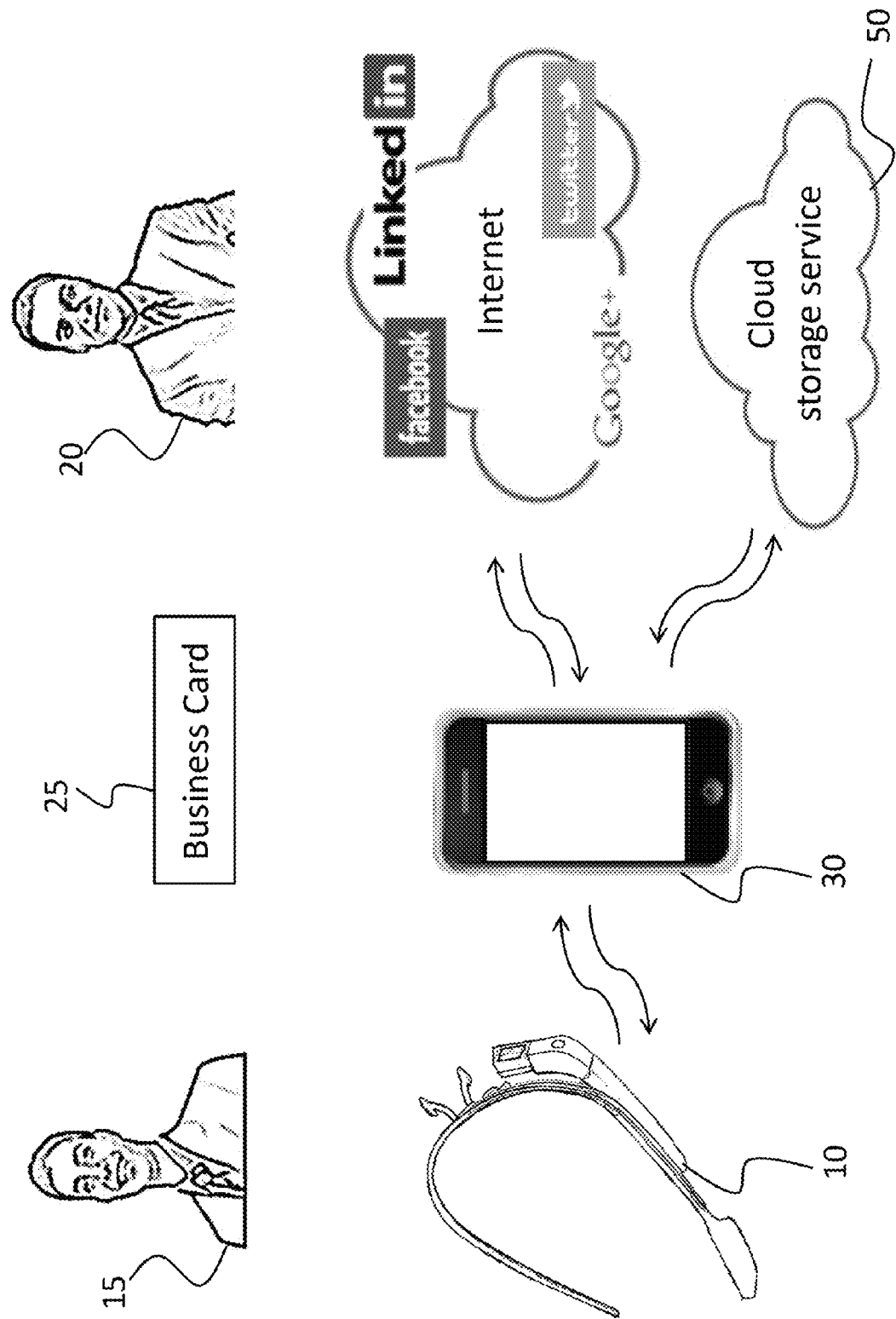
FIG. 1 shows a block diagram of a system for a first user using a wearable device to save or retrieve personal contact record of a second user via the internet or a cloud storage service.
Figure 2:
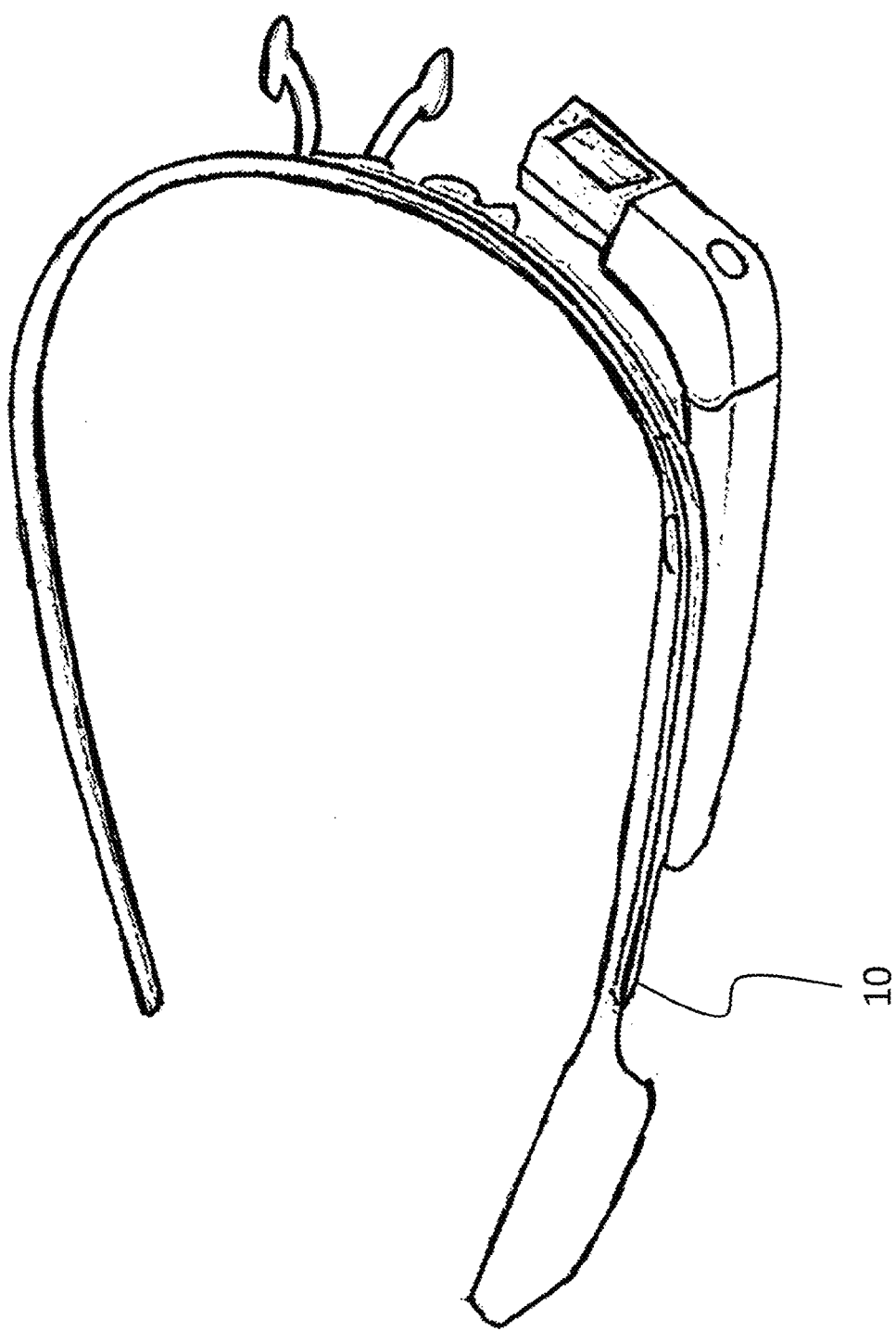
FIG. 2 shows a conventional wearable device.
Figure 3:
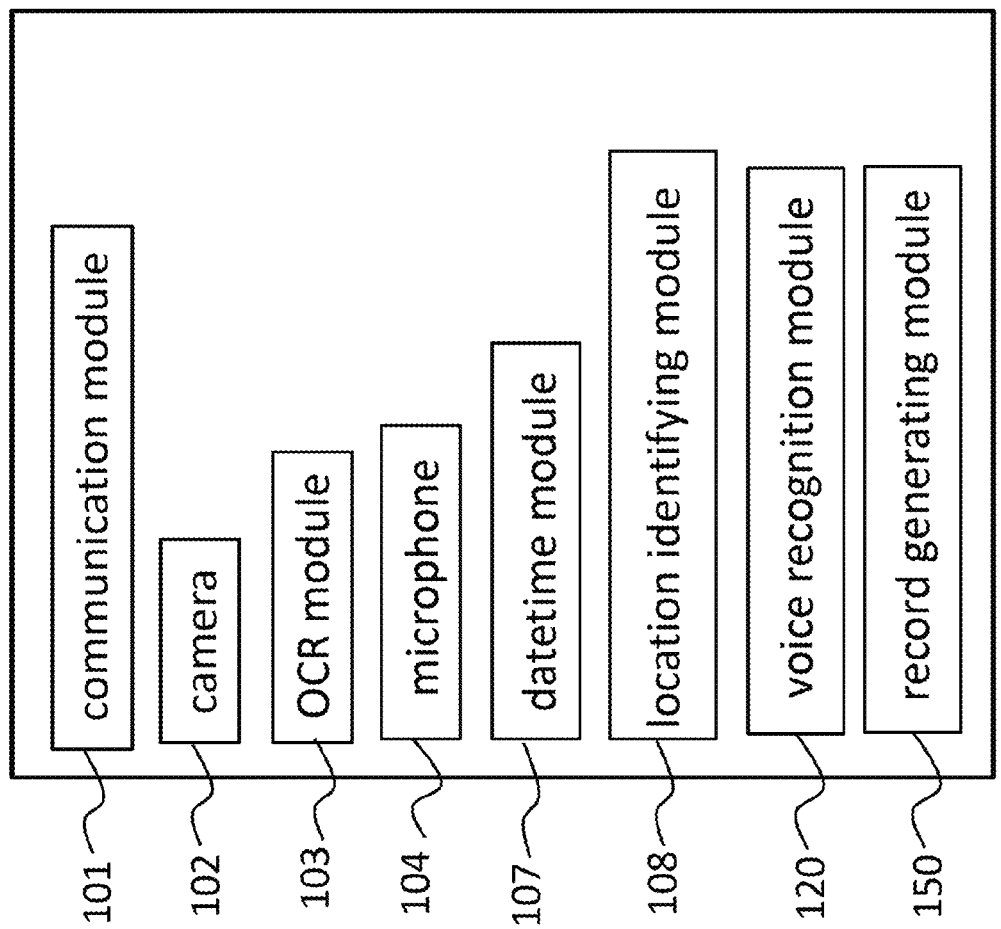
FIG. 3 shows a block diagram of a wearable device capable of performing the method to generate or retrieve personal contact record of persons when worn by the first user according to a first embodiment.

Referring to FIGS. 1 and 3, a wearable device 10 worn by a first user 15 to generate or retrieve a personal contact record of a second user 20 is illustrated. The wearable device 10 may be wirelessly connected for two-way communications to a smartphone 30 (an example of a mobile communication device equipped with Wifi or Bluetooth communication capability) via a communication module 101 (e.g. complying with Wifi or Bluetooth standard) for access to the internet via the smartphone 30. A business card 25 provided by the second user contains information of the second user 20, for example, the full name, the contact information (e.g., telephone numbers, fax numbers, e-mails), and the business information (e.g., the company name, the title/department, and the address of the company) of the second user 20.

Figure 5:
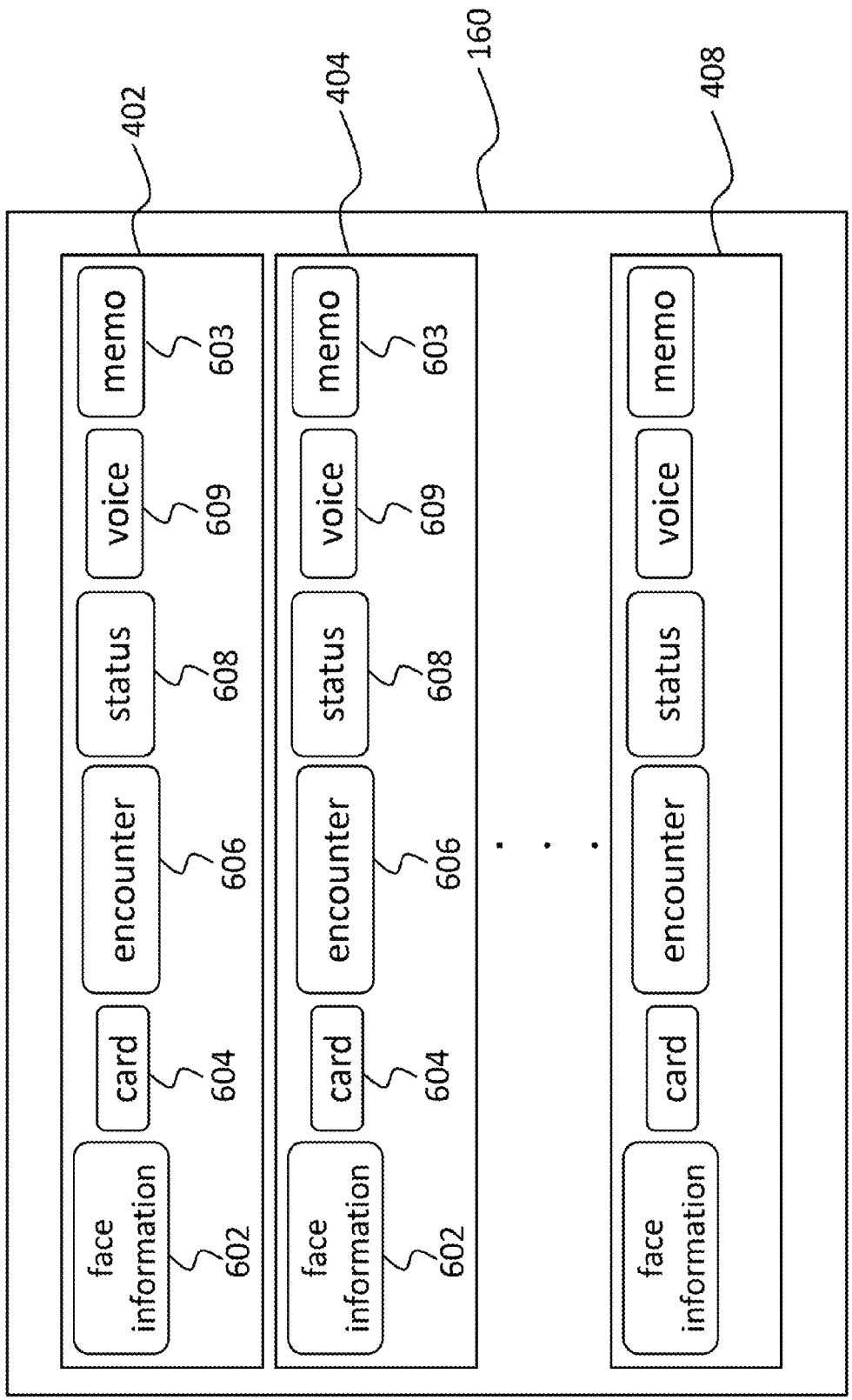
FIG. 5 shows a plurality of personal contact records stored in a contact database.
Figure 6:
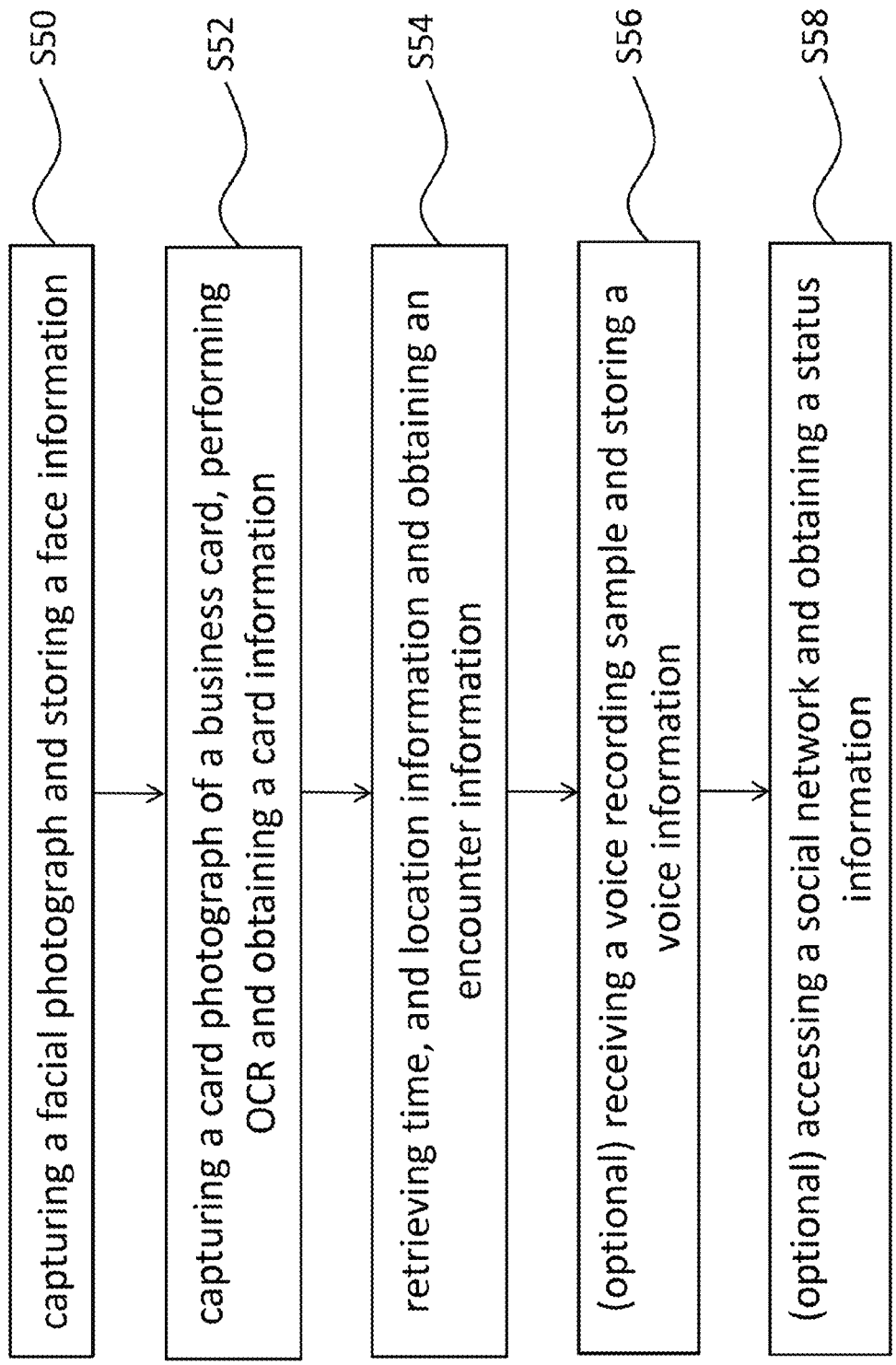
FIG. 6 shows a flowchart diagram of a method for the first user to generate a personal contact record of the second user on the wearable device according to an embodiment of present disclosure.

Referring to FIGS. 5 and 6, a method for the wearable device 10 worn by the first user 15 to generate a personal contact record 402 of the second user 20 when encountering the second user 20 is shown in a flowchart diagram according to an embodiment of present disclosure. The wearable device 10 includes a camera. The method for the wearable device 10 to generate the personal contact record 402 of the second user 20 includes the following steps. Step S50: a facial photograph is captured by the camera, and a face information 602 of the second user 20 is generated accordingly. Step S52: a card photograph of a business card 25 of the second user 20 is captured by the camera; optical character recognition (OCR) is performed to the business card 25, and a card information 604 of the second user 20 is generated. Step S54: time and location information provided by the wearable device 10 are retrieved, and an encounter information 606 corresponding to the encounter session is generated. The time information provided by the wearable device 10 may include a date information (e.g. an accurate date as "Jul. 10, 2013" or "July of 2013", or a rough date as "summer of 2013"). The time information may also include a clock information (e.g., an accurate clock time as "9:47 am", or a rough clock time as "around 10 o'clock in the morning") of the encounter. Step S56: (optional) a voice recording sample of the second user 20 (for speaker recognition later) is received, and a voice information 609 thereof is generated; Step S58: (optional) a social network is accessed and a status information 608 of the second user 20 is generated. The personal contact record 402 including the face information 602, the card information 604, the encounter information 606, the (optional) voice information 609, and the (optional) status information 608 is thus generated.

The personal contact record 402 may be stored in the wearable device 10 or in the cloud storage service 50 (e.g. Google Drive, Box.com, Skydrive . . . etc.). The personal contact record 402 is available for later retrieval when next time the first user 15 encounters the second user 20.

In the embodiment described above for generating the personal contact record 402 of the second user 20, the encounter information 606 may further include the discussion information collected from oral communications between the first user 15 and the second user 20 during the encounter session. In an alternative embodiment, the wearable device 10 may perform automatic speech recognition (ASR) to ambient voices of the encounter session for a certain period of time (e.g. 3 minutes of the oral communication between the first user 15 and the second user 20) for isolating and analyzing various voices, extracting a plurality of keywords from the voice recording samples, and then including the keywords into the personal contact record 402 of the contact database 160 as shown in FIG. 5. The encounter session of the first user 15 and the second user 20 may take place in the form of an in-person encounter or a virtual encounter (which takes place in an online community that takes the form of a computer-based simulated environment through which users can interact with one another). In the case of the virtual encounter, the facial photograph is obtained by capturing a photograph of the second user 20 showing on a display (e.g. an LCD monitor), and the card photograph is obtained by capturing a photograph of the business card also showing on the display. As shown in FIG. 5, the above method may be repeated, so a plurality of personal contact records 402, 404, . . . 408 . . . etc., may be generated and accumulated in the contact database 160. The contact database 160 may be stored on the wearable device 10 or on a cloud storage service 50.

Figure 7:
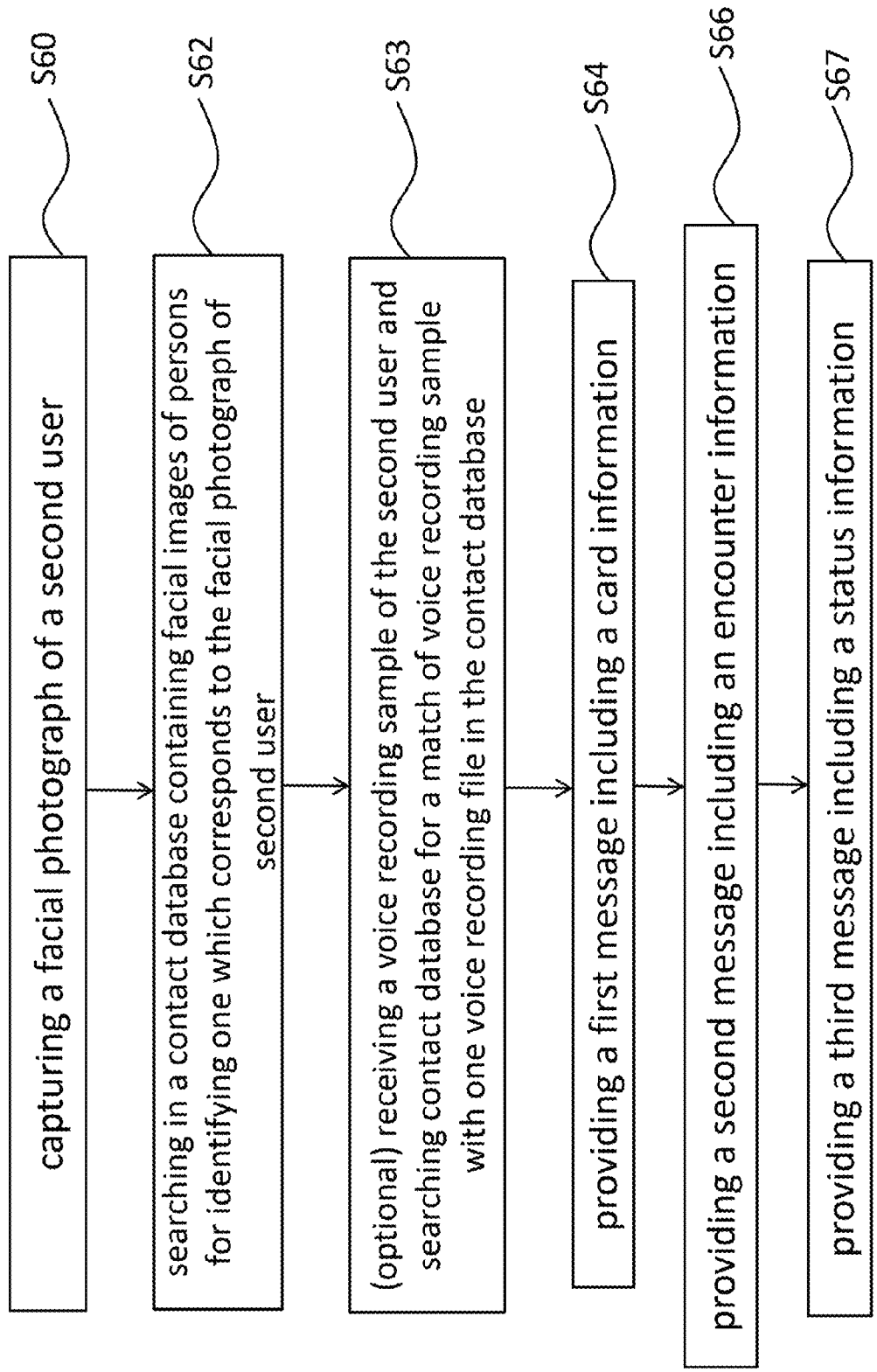
FIG. 7 shows a flowchart diagram of a method for the first user to retrieve a personal contact record of the second user on the wearable device according to another embodiment of present disclosure.

Referring to FIG. 7, a method for the wearable device 10 worn by a first user 15 to retrieve a personal contact record 402 when encountering a second user 20 is shown in a flowchart diagram according to another embodiment of present disclosure. The wearable device 10 includes a camera. The method includes the following steps. Step S60: a facial photograph of the second user 20 is captured by the camera. Step S62: a contact database 160 comprising facial images of persons is searched, wherein each facial image in the contact database 160 is associated with a corresponding identity of a person, and the captured facial photograph of the second user 20 is compared with the facial images, and upon matching of the captured facial photograph with a specific facial image stored in the contact database 160, the corresponding identity of the second user 20 is determined. Step S63: (optional) a voice recording sample of the second user 20 is received, and the contact database 160 comprising voice recording files is searched, in which each voice recording file in the contact database 160 is associated with a corresponding identity of a person, and the received voice recording sample of the second user is compared with the voice recording files in the contact database 160, and upon matching of the received voice recording sample with a specific voice recording file, the corresponding identity of the second user 20 is determined. Step S64: a first message including a card information 604 (which may be retrieved from a card photograph taken in a previous encounter with the second user 20) is retrieved and provided to the first user 15 in an audio or visual manner. The first message includes at least a full name (of the identified second user 20). Step S66: a second message including an encounter information 606 is retrieved and provided to the first user 15 in an audio or visual manner. The encounter information 606 includes time and location of a previous encounter session. Step S67: (optional) a third message including a status information 608 is retrieved and provided to the first user 15 in an audio or visual manner. The status information 608 is obtained by the wearable device 10 to access one or more social networks (e.g. Facebook, Twitter, Linkedin, Google+ . . . , etc.) on behalf of the first user 15 (i.e., this step may involve pre-storing of the account names and passwords of the first user 15 for the various social networks, and logging into the social networks automatically). In addition, other additional optional steps may include: performing a search on the social networks using the full name or the contact information (e.g., the e-mail address) of the identified second user 20 as a keyword, and retrieving one or more messages which were posted by the second user 20 and have received the highest number of recent feedbacks (including for example, "like" button, and/or comments) within a certain period of time (e.g. within one week or 3 months). The status information 608 may help the first user 15 come up with one or more proper topics to communicate with the second user 20.

In an embodiment of present disclosure, an encounter location information, included in the encounter information 606 (since an encounter information includes the time and location of an encounter session), may be obtained by using one or more of GPS, Cellular, or Wifi signals to determine the location of the wearable device 10 at the encounter session. The encounter location information may also be obtained by searching and identifying or recognizing places and landmarks (e.g. a landmark architecture or landscape) containing in the background of the facial photograph taken at the encounter session. In one embodiment, instead of being provided in a latitude and longitude format, the encounter location information is provided to the first user 15 in a format such as an address, a building name, or an event venue title which may be obtained by the wearable device 10 to further refer to a map (e.g. Google Maps, a web mapping service application and technology provided by Google) and the first user's personal calendar (which may be stored in the wearable device 10 or in a Cloud service accessible to the wearable device 10) around the time of the encounter session. The Cloud service for storing the first user's personal calendar may be, for example, Google Calendar provided by Google. The step of searching through a contact database 160 for attempting to match the captured facial photograph with facial images in the contact database 160 and determining the corresponding identity of the person of the matched facial image found in Step S62 in FIG. 6 may include performing of facial recognition on the facial photograph. The facial recognition may include identifying of facial features by extracting landmarks, features, visual details of the skin, as captured in the camera 102 of the wearable device 10. The facial recognition may also include using a 3D (three-dimensional) image capturing device (not shown) to capture information about the shape of a face, and the information is then used to identify distinctive features on the surface of a face, such as the contour of the eye sockets, nose, and chin. The facial recognition may be provided by Artec Group 3D face recognition technology as represented by a line of Broadway 3D biometric devices, or Facematch software provided by Videmo Intelligent Videoanalysis. Meanwhile, the step of receiving a voice recording sample of the second user, searching through the contact database comprising voice recording files, and matching of the received voice recording sample with one of the voice recording files in the contact database 160 and determining the corresponding identity of the person of the matched voice recording file may include performing of speaker recognition. The speaker recognition may use the acoustic features of speech that are found to be different between individuals. The acoustic features of speech may include anatomy (e.g., size and shape of the throat and mouth) and learned behavioral patterns (e.g., voice pitch, speaking style). The speaker recognition may be provided by caller authentication solution offered by VoiceTrust, or RecoMadeEasy® speaker recognition system provided by Recognition Technologies, Inc.

According to a first embodiment, a wearable device 10 capable of performing the method to generate or retrieve a personal contact record of a second user 20, when worn by the first user 15, is shown in a block diagram of FIG. 3. The wearable device 10 includes a communication module 101, a camera 102, an optical character recognition (OCR) module 103, a datetime module 107, a location identifying module 108, a microphone 104 (which is optional), and a record generating module 150. In the first embodiment, the camera 102 is configured to capture a card photograph of a business card and a facial photograph of the second user 20. The camera 102 may be triggered by the first user 15 to take the photographs (by either entering a voice command or clicking a physical/virtual button on the wearable device 10) upon encountering the second user 20 in an encounter session. The OCR module 103 is configured for performing optical character recognition (OCR) on the card photograph and generating a card information 604. The location identifying module 108 is used for providing a location information identifying the location of the wearable device 10 at the encounter session. The datetime module 107 is configured for providing a time information of the encounter session. The time information may include a date information and/or a clock information. The (optional) microphone 104 is configured for receiving a voice recording sample of the second user 20 and generating a voice information 609. The record generating module 150 is configured for generating a personal contact record 402 including the face information 602, the card information 604, the location information, the time information, and (optional) the voice information 609. The personal contact record 402 may be accumulated and stored into the contact database 160 as shown in FIG. 5. The microphone 104 may also receive a voice command from the first user 15, so the first user 15 may trigger or activate the wearable device 10 to perform the steps of generating the personal contact record 402 accordingly. The first user 15 may further provide a voice memo for the encounter session, and the voice memo may be converted into texts by a voice recognition module 120, to be incorporated into the personal contact record 402 as a text memo 603, and stored in the contact database 160 for later retrieval in a next encounter session.

Figure 4:
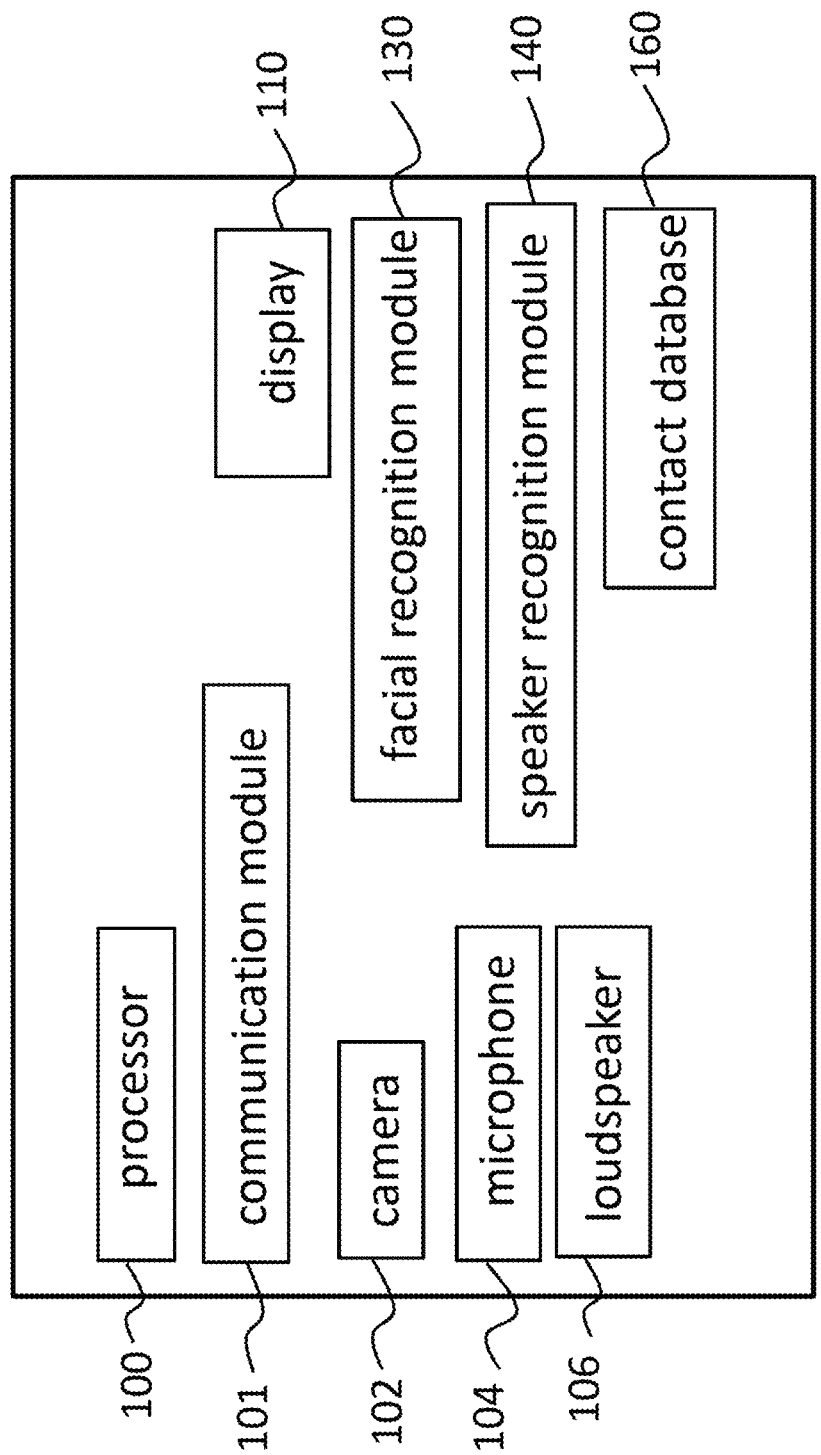
FIG. 4 shows a block diagram of a wearable device capable of performing the method to generate or retrieve personal contact record of persons when worn by the first user according to a second embodiment.

According to a second embodiment, a wearable device 10 capable of performing the method to generate or retrieve a personal contact record of a second user 20 when encountering the second user 20 is shown in a block diagram of FIG. 4. The wearable device 10 to be worn by the first user 15 includes a processor 100, a communications module 101, and a camera 102. The communication module 101 is configured for providing internet access. The camera 102 is configured for capturing a facial photograph of the second user 20. In the second embodiment, the processor 100 is configured to search through a contact database 160 containing facial images of persons for identifying the identity of the second user 20, generate a first message (audio or visual) including a card information 604 (which may be retrieved from a business card photograph taken in a previous encounter session) including at least a full name, generate a second message (audio or visual) including an encounter information 606 including time and location of a previous encounter, and (optionally) the text memo 603, and (optionally) generate a third message (audio or visual) including a status information 608 obtained by performing a search on one or more social networks for latest status update of the second user 20. The communication module 101 may include a cellular communication unit (not shown) for connecting to the nearby base stations and thus have access to the internet. Alternatively, the communication module 101 may include a local communication module (e.g. complying with Wifi or Bluetooth standard) for connecting to a Wifi hotspot, or connecting to a smartphone (equipped with Wifi or Bluetooth communication capability), and thus have access to the internet via the smart phone. The wearable device 10 may further include a loudspeaker 106 for producing the first message, the second message, and the third message to the first user 15 in an audio manner. The wearable device 10 may include a display 110 for producing the first message, the second message, and the third message to the first user 15 in a visual manner. The wearable device 10 may include a facial recognition module 130 for performing facial recognition on the facial photograph taken for the second user 20 at the encounter session. The wearable device 10 may include a microphone 104 for receiving voice recording sample of the second user 20, and a speaker recognition module 140 for performing speaker recognition on the voice recording sample recorded at the encounter session.

It is believed that the present embodiments and their advantages will be understood from the foregoing description, and it will be apparent that various changes or modifications may be made thereto without departing from the spirit and scope of the disclosure or sacrificing all of its material advantages.

What is claimed is:

1. A method for a wearable device worn by a first user to generate a personal contact record when encountering a second user in an encounter session, the wearable device having a camera, the method comprising the steps of:
    capturing a facial photograph using the camera, and generating a face information of the second user;
    capturing a card photograph of a business card of the second user using the camera;
    performing optical character recognition (OCR) to the business card to obtain a card information of the second user, and
    generating the personal contact record including the face information, the card information, and an encounter information including time information and location information retrieved from the wearable device, wherein the encounter information includes discussion information collected from communications taken place between the first user and the second user during the encounter session;
    performing automatic speech recognition (ASR) to ambient voices of the encounter session for isolating and analyzing voices of the first user and the second user;
    wherein the wearable device is a smart glasses worn by the first user.

2. The method of claim 1, further comprising receiving a voice recording sample of the second user, generating a voice information, and including the voice information into the personal contact record.

3. The method of claim 1, wherein the time information includes a date information or a clock information of the encounter session.

4. The method of claim 2, wherein the personal contact record is stored in a contact database stored on the wearable device or on a cloud storage service.

5. The method of claim 2, wherein the wearable device performs automatic speech recognition (ASR) to ambient voices for a period of time for extracting a plurality of keywords from the voice recording sample, and then including the keywords into the personal contact record.

6. The method of claim 1, wherein the encounter session of the first user and the second user takes place in an in-person encounter or a virtual encounter, and in the case of the virtual encounter, the facial photograph is obtained by capturing a photograph of the second user showing on a display, and the card photograph is obtained by capturing a photograph of the business card also showing on the display.

7. A method for a wearable device worn by a first user to retrieve a personal contact record from a contact database when encountering a second user, the wearable device having a camera, the method comprising the steps of:
    capturing a facial photograph of the second user; searching through the contact database comprising facial images, wherein each of the facial images is associated with a corresponding identity of a person, and the captured facial photograph of the second user is attempted to match with one of the facial images, so as to determine an identity of second user;
    providing a first message including at least a full name of identity; and
    providing a second message comprising an encounter information including time and location of a previous encounter session, wherein the encounter information includes discussion information collected from communications taken place between the first user and the second user during the encounter session;
    performing automatic speech recognition (ASR) to ambient voices of the encounter session for isolating and analyzing voices of the first user and the second user;
    wherein the wearable device is a smart glasses worn by the first user.

8. The method of claim 7, further comprising receiving a voice recording sample of the second user, and searching through the contact database comprising voice recording files, wherein each voice recording file in the contact database is associated with a corresponding identity of a person, and the received voice recording sample of the second user is attempted to match with one of the voice recording files in the contact database, so as to determine an identity of the second user.

9. The method of claim 7, further comprising: providing a third message having a status information obtained by accessing a social network on behalf of the first user.

10. The method of claim 7, wherein the location information is obtained by using a GPS, Cellular, or Will signal to determine location of the wearable device at the previous encounter session, or by searching and identifying a place or a landmark contained in the background of the facial photograph taken in the previous encounter session.

11. The method of claim 7, wherein the step of searching through the contact database comprising facial images includes performing facial recognition on the captured facial photograph.

12. The method of claim 11, wherein the facial recognition comprises identifying of facial features by extracting landmarks, features, visual details of skin of the second user in the captured facial photograph to identify distinctive features of a face.

13. The method of claim 8, further comprising performing speaker recognition, and the speaker recognition uses acoustic features of speech comprising anatomy and learned behavioral patterns.

14. A wearable device to be worn by a first user, the wearable device is configured to generate a personal contact record when the first user encounters a second user in an encounter session, the wearable device comprises:
- a camera configured to capture a card photograph of a business card and a facial photograph of the second user, the camera is activated by the first user to capture the card photograph and the facial photograph in the encounter session, a face information is generated based on the facial photograph;
- an optical character recognition (OCR) module, for performing optical character recognition (OCR) on the card photograph and generating a card information;
- a location identifying module for providing a location information identifying location of the wearable device at the encounter session;
- a datetime module for providing a time information of the encounter session; and
- a record generating module for generating the personal contact record including the face information, the card information, the location information, and the time information, wherein the encounter information includes discussion information collected from communications taken place between the first user and the second user during the encounter session;
- a processor, for performing automatic speech recognition (ASR) to ambient voices of the encounter session for isolating and analyzing voices of the first user and the second user;
- wherein the wearable device is a smart glasses worn by the first user.

15. The wearable device of claim 14, further comprising a microphone for receiving a voice recording sample of the second user and generating a voice information, and configured to be capable of receiving a voice command from the first user to activate the wearable device to generate the personal contact record.

16. The wearable device of claim 14, further comprising a voice recognition module, wherein the first user provides a voice memo for the encounter session, and the voice memo is converted into a text memo by the voice recognition module and is included into the personal contact record.

17. A wearable device to be worn by a first user, comprising:
- a processor;
- a communication module configured for providing interact access;
- a camera configured for capturing a facial photograph of a second user, wherein the processor is configured to search through a contact database containing facial images of persons for a match with the captured facial photograph so as to obtain an identity of the second user, and generate a first message including at least a full name and a second message including an encounter information comprising time and location of a previous encounter, wherein the encounter information includes discussion information collected from communications taken place between the first user and the second user during the encounter session;
- wherein the processor is configured for performing automatic speech recognition (ASR) to ambient voices of the encounter session for isolating and analyzing voices of the first user and the second user;
- wherein the wearable device is a smart glasses worn by the first user.

18. The wearable device of claim 17, further comprising generating a third message including a status information obtained by performing a search on a social network for latest status update of the second user.

19. The wearable device of claim 17, wherein the communication module includes a cellular communication unit for connecting to a cellular base station, or includes a local communication module for connecting to a Wifi hotspot or a mobile phone.

20. The wearable device of claim 17, further comprising a loudspeaker or a display for providing the first message, the second message, and the third message to the first user.

* * * * *